United States Patent
Archbold (10) Patent No.: US 12,469,345 B2
(45) Date of Patent: *Nov. 11, 2025

(54) AUTOMATIC GARAGE DOOR CONTROL

(71) Applicant: Universal Electronics Inc., Scottsdale, AZ (US)

(72) Inventor: Michael Archbold, San Marcos, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 659 days.

This patent is subject to a terminal disclaimer.

(21) Appl. No.: 17/870,713

(22) Filed: Jul. 21, 2022

(65) Prior Publication Data
US 2022/0358801 A1    Nov. 10, 2022

Related U.S. Application Data

(60) Continuation of application No. 16/866,170, filed on May 4, 2020, now Pat. No. 11,398,118, which is a (Continued)

(51) Int. Cl.
*G07C 9/00* (2020.01)
*E05F 15/668* (2015.01)
(Continued)

(52) U.S. Cl.
CPC ........ *G07C 9/00309* (2013.01); *E05F 15/668* (2015.01); *E05F 15/76* (2015.01);
(Continued)

(58) Field of Classification Search
CPC ............ G07C 9/00309; G07C 9/00182; G07C 2009/00769; G07C 2009/00928;
(Continued)

(56) References Cited

U.S. PATENT DOCUMENTS 4,843,639 A    6/1989  Beals
6,392,537 B1   5/2002  Tazumi et al.
(Continued)

FOREIGN PATENT DOCUMENTS

CN        110126781 A     8/2019
DE      102016226188 A1  10/2019
WO        2005066442 A1   7/2005

OTHER PUBLICATIONS

1 Office Action from European patent application No. 18573093.2, dated Apr. 23, 2024, 6 pp.
(Continued)

*Primary Examiner* — Aryan E Weisenfeld
(74) *Attorney, Agent, or Firm* — Greenberg Traurig, LLP (57) ABSTRACT

A method, apparatus and system is disclosed for automatically opening and closing a garage door without user intervention. A vehicle-mounted mobile transmitter autonomously and continuously transmits a repeating signal pattern when power is applied to the transmitter as a vehicle is started by a user. A movable barrier gateway device receives the signals from the mobile transmitter and compares an identification code contained in each of the signals to an identification code stored in memory. When a match is found, the movable barrier gateway device sends a signal to a movable barrier controller to open the garage door, and keep the door open as long as the movable barrier gateway continues to receive the signals from the mobile transmitter.

18 Claims, 4 Drawing Sheets

Related U.S. Application Data division of application No. 15/441,492, filed on Feb. 24, 2017, now Pat. No. 10,643,408.

(51) Int. Cl.
*E05F 15/76* (2015.01)
*E05F 15/77* (2015.01)

(52) U.S. Cl.
CPC .......... *E05F 15/77* (2015.01); *G07C 9/00182* (2013.01); *E05Y 2400/66* (2013.01); *E05Y 2400/80* (2013.01); *E05Y 2400/82* (2013.01); *E05Y 2400/8515* (2024.05); *E05Y 2600/452* (2013.01); *G07C 2009/00769* (2013.01); *G07C 2009/00928* (2013.01)

(58) Field of Classification Search
CPC ......... E05F 15/668; E05F 15/76; E05F 15/77; E05Y 2400/66; E05Y 2400/80; E05Y 2400/82; E05Y 2600/452
See application file for complete search history.

(56) References Cited

U.S. PATENT DOCUMENTS

| | | |
|---|---|---|
| 6,563,431 B1 | 5/2003 | Miller |
| 7,509,991 B2 | 3/2009 | Weik, III et al. |
| 7,778,604 B2 | 8/2010 | Bauman et al. |
| 8,115,616 B2 | 2/2012 | Gonzaga |
| 8,587,404 B2 | 11/2013 | Laird |
| 9,656,691 B2 | 5/2017 | Heimberger et al. |
| 10,015,257 B2 | 7/2018 | Thanayankizil |
| 10,060,175 B1 | 8/2018 | Lickfelt et al. |
| 10,115,256 B2 | 10/2018 | Davis |
| 10,134,249 B2 | 11/2018 | Fu et al. |
| 10,310,500 B1 | 6/2019 | Brady et al. |
| 10,410,448 B2 | 9/2019 | Lickfelt et al. |
| 10,643,408 B2 | 5/2020 | Archbold |
| 2003/0043021 A1 | 3/2003 | Chung |
| 2003/0112121 A1 | 6/2003 | Wilson |
| 2005/0134426 A1 | 6/2005 | Mullet et al. |
| 2006/0220785 A1 | 10/2006 | Ferdman |
| 2006/0238316 A1 | 10/2006 | Taki et al. |
| 2008/0062000 A1 | 3/2008 | Styers et al. |
| 2010/0242369 A1 | 9/2010 | Laird |
| 2010/0257784 A1 | 10/2010 | Fitzgibbon |
| 2010/0289661 A1 | 11/2010 | Styers et al. |
| 2011/0032073 A1 | 2/2011 | Mullet et al. |
| 2013/0081329 A1 | 4/2013 | French |
| 2013/0326595 A1 | 12/2013 | Myers et al. |
| 2014/0190082 A1 | 7/2014 | Sheldon |
| 2015/0262443 A1 | 9/2015 | Chong |
| 2016/0018798 A1 | 1/2016 | Jiang et al. |
| 2017/0148243 A1 | 5/2017 | Shin et al. |
| 2017/0313421 A1 | 11/2017 | Gil |
| 2018/0247475 A1 | 8/2018 | Archbold |
| 2018/0357847 A1 | 12/2018 | Shinar et al. |
| 2019/0027044 A1 | 1/2019 | Laur et al. |
| 2019/0051071 A1 | 2/2019 | Lickfelt et al. |
| 2019/0161190 A1 | 5/2019 | Gil et al. |
| 2021/0074092 A1 | 3/2021 | Davis et al. |
| 2021/0324672 A1 | 10/2021 | Altiner et al. |

OTHER PUBLICATIONS

Underwriters Laboratories, Inc., UL 325, Standard for Door, Drapery, Gate, Louver, and Window Operators and Systems, Safety Standard, Oct. 13, 2011, pp. 60B and 61, 5th Edition, Underwriters Laboratories, Inc., US.

ISA/US, Int. Search Report and Written Opinion issued on PCT application No. US18/18677, dated May 11, 2018, 15 pages.

EPO, Extended European Search Report issued on European patent application No. 18757309.2, dated Dec. 1, 2020, 7 pgs.

AUTOMATIC GARAGE DOOR CONTROL

CROSS-REFERENCE TO RELATED APPLICATIONS

The present application is a continuation of U.S. patent application Ser. No. 16/866,170, filed on May 4, 2020, which is a divisional of U.S. patent application Ser. No. 15/441,492, filed on Feb. 24, 2017.

BACKGROUND

Description of the Related Art

Remote-control garage door openers are well known. They generally comprise battery-operated, handheld remote controls often placed in cars or circuitry integrated into cars, such as the Homelink® vehicle-based wireless control system. These remote controls transmit a frequency spectrum range between 300-400 MHz and most of the transmitter/receivers rely on hopping or rolling code technology. This approach prevents criminals from recording a code and replaying it to open a garage door. Since the signal is supposed to be significantly different from that of any other garage door remote control, manufacturers claim it is impossible for someone other than the owner of the remote to open the garage. When the transmitter sends a code, it generates a new code using an encoder. The receiver, after receiving a correct code, uses the same encoder with the same original seed to generate a new code that it will accept in the future. Because there is a high probability that someone might accidentally push the open button while not in range and desynchronize the code, the receiver generates look-a-head codes ahead of time.

User of such garage door remote controllers typically open their garages when approaching their homes, transmitting a signal that is received by a receiver located inside the garage and generally incorporated into a motor/driver, which causes a garage door to open. Although remote controls are generally not used to close garage doors (most home garage door openers provide a wall switch to manually open/close garage doors), this is nonetheless possible.

While garage door remote controllers have made opening and sometimes closing garage doors more convenient, they still require a user to press a button in order to operate a garage door opener. While this is convenient most of the time, there are other times where it is not, such as when wearing gloves or while driving or when both hands are occupied. Motorcycle operators have an especially cumbersome time using conventional remote control devices, as they typically must place their motorcycle in neutral, remove gloves that they may be wearing, dig around in pockets to find the remote, and then reverse the process once the garage door has been opened or closed.

It would, therefore, be desirable to overcome the shortcomings of the prior art to make it even more convenient for vehicle operators to automatically open and close their garage doors.

SUMMARY

The embodiments described herein relate a system, apparatus and method to automatically open and close a garage door without user intervention. In one embodiment, a method is described, performed by a movable barrier gateway device, for automatically opening and closing a garage door without user intervention, comprising receiving, by a communication interface, one or more signals transmitted autonomously and repeatedly by a mobile transmitter mounted in or to a vehicle when the vehicle is in proximity to the garage door, determining, by a processor, that an identification code of at least one of the one or more signals matches an identification code stored in a memory, and in response to determining that an identification code of at least one of the one or more signals matches an identification code stored in the memory sending, by the processor via a control signal output port, a signal to cause the movable barrier controller to open the garage door.

In another embodiment, a movable barrier gateway device is described for automatically opening and closing a garage door without user intervention, comprising a communication interface for receiving wireless signals transmitted autonomously and repeatedly by a mobile transmitter installed in or to a vehicle, when the vehicle is in proximity to the garage door, an output signal port for providing control signals to a legacy movable barrier controller to cause the movable barrier controller to open and close the garage door, a memory for storing processor-executable instructions and an identification code of an authorized mobile transmitter, and a processor, coupled to the communication interface, the output signal port and the memory, for executing the processor-executable instructions that cause the movable barrier gateway device to receive one or more signals transmitted autonomously and repeatedly by the mobile transmitter when the vehicle is in proximity to the garage door, determine that an identification code of at least one of the one or more signals matches an identification code stored in the memory, and in response to determining that an identification code of at least one of the one or more signals matches an identification code stored in the memory, send a signal to the movable barrier controller for the movable barrier controller to open the garage door.

In yet another embodiment, a system is described for automatically opening and closing a garage door without user intervention, comprising a mobile transmitter installed on or in a vehicle and coupled to a vehicle power source that is energized only when the vehicle's ignition system is turned on, wherein the mobile transmitter begins autonomously and repeatedly transmitting one or more signals, each comprising an identification code identifying the mobile transmitter, when the vehicle's ignition system is turned on, and a movable barrier gateway device configured to receive the one or more signals transmitted from the mobile transmitter when the mobile transmitter is within range of the movable barrier gateway device, determine that the identification code in at least one or more of the received signals matches an identification code stored in a memory, and send a second signal to a legacy movable barrier controller to open the garage door when one or more of the received signals matches an identification code stored in a memory.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to a system, method and apparatus for automatically operating movable barriers, such as garage doors, swing gates, sliding gates, or other types of doors, windows, gates, and the like without user intervention. The ideas presented herein are particularly useful in conjunction with legacy movable barrier systems lacking remote operation capabilities.

Figure 1:
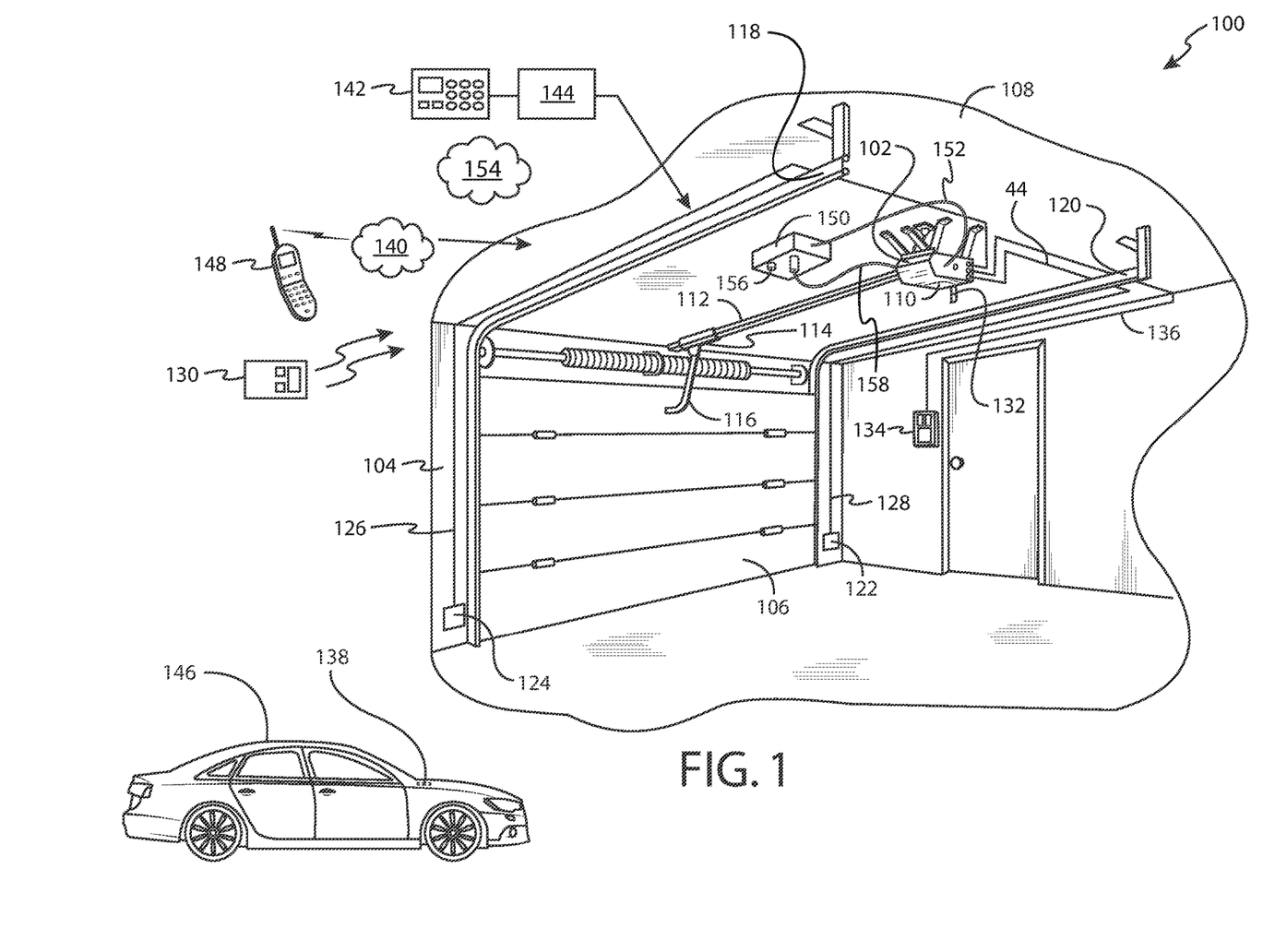
FIG. 1 is an illustration of a garage door opening system for automatically controlling operation of a garage door without user intervention.

FIG. 1 is an illustration of a movable barrier system 100, comprising a legacy movable barrier controller 102, here a garage door opener head unit, mounted within a garage 104 and employed for controlling the opening and closing of the movable barrier 106, here a garage door. The movable barrier controller 102 is mounted to the ceiling 108 of the garage 104. The movable barrier controller 102 includes a motor and processing circuitry for providing electrical power to the motor upon receipt of certain commands. The controller responds to various inputs by starting and stopping the motor, which is used to move the barrier, and by turning a light 110 on and off. Extending from the movable barrier controller 102 is a rail 112 having a releasable trolley 114 attached thereto and arm 116 extending from the trolley 114 to the multiple-paneled garage door 106 positioned for movement along a pair of door rails 118 and 120. The movable barrier controller 102 transfers the garage door 106 between open and closed positions for allowing access to and from the garage 104.

For safety purposes, an optical emitter 122 and optical detector 124 are provided. These may be coupled to the movable barrier controller 102 by a pair of wires 126 and 128. The emitter 122 and detector 124 are used to provide safety of operation in barrier movement. To provide such safety of operation, the controller responds to the emitter 122 and detector 124 and will reverse and open the door if an obstruction is sensed in the doorway.

At least one local transmitter unit 130 is adapted to send wireless signals to an antenna 132 positioned in, on, or extending from the movable barrier controller 102. The antenna 132 is coupled to a receiver located within the movable barrier controller 102. The local transmitter unit 130 typically transmits low-power RF signals that are effective within a limited geographical area from movable barrier controller 102. A wall mounted wall switch 134, which may include any number of switches as required for a given system, is mounted on a wall of the garage 104. The wall switch 134 communicates with the movable barrier controller 102 through a direct physical wired connection 136 to the movable barrier controller 102 using any commonly known method of communication, including serial bus communication. The local transmitter unit 130 and wall switch 134 are herein designated "local control devices" because they typically in visual range of the garage door 106 as they are used.

The signals emanating from local transmitter unit 130 may comprise one or more of a code format, a rolling code, a signal frequency, and/or a signal modulation. With respect to code formats, for example, fixed code or rolling code formats with and without encryption as known in the art, codes may be sent in a number of formats from local transmitter unit 130 and movable barrier controller 102. The signals, such as radio frequency or other wireless transmission carriers may be sent between local transmitter unit 130 and movable barrier controller 102 according to a variety of frequencies or modulations. Signals may also be modulated in a number of different ways; thus, the local transmitter unit 130 may be configured to communicate with the movable barrier controller 102 via a variety of signal modulation techniques.

A movable barrier gateway device 150 may be incorporated into the movable barrier system 100 in order to allow aftermarket, automatic remote control capability, e.g., to automatically open and/or close garage door 106 when a user is in proximity of garage door 106. The movable barrier gateway device 150 may be located in proximity to the movable barrier controller 102 as shown. In one embodiment, the movable barrier gateway device 150 comprises male AC prongs that plug into an existing AC electrical supply socket (not shown) and a female AC socket for supplying power to the movable barrier controller 102 via power cord 158. The movable barrier gateway device 150 is further coupled to the movable barrier controller 102 via a communication channel 152, shown in FIG. 1 as a signal cable. Communication channel 152 provides commands to move the garage door 106 from the movable barrier gateway device 150 into input terminals located on the movable barrier controller 102. The terminals on the movable barrier controller 102 are for local, wired control of the garage door 106, such as the terminals used by wall switch 132. Communication channel 152 may be wired in parallel with direct physical wired connection 136 so that either movable barrier gateway device 150 or wall switch 134 may control operation of garage door 106. In this configuration, garage door 106 may be moved either by operating wall switch 134 or by receiving one or more signals from mobile transmitter 138, which is typically mounted on or in vehicle 146. Communication channel 152 may, alternatively, comprise air, as in the case of wireless RF transmission of signals over-the-air to barrier controller 102 either directly or via a local-area network 154. Local area network 154 typically comprises a Wi-Fi-based network located in a home nearby garage 104 or directly inside garage 104.

A mobile transmitter 138 is used to automatically open and/or close garage door 106 as the vehicle approaches or moves away from garage door 106. In one embodiment, mobile transmitter 138 autonomously (i.e., without user input or intervention) and repeatedly transmits signals that are received directly by movable barrier gateway device 150 when mobile transmitter 138 is within range of movable barrier gateway device 150. In another embodiment, the signals are received by local-area network 154, such as a home Wi-Fi network, when mobile transmitter 138 is within range of local-area network 154, where they are routed to movable barrier gateway device 150 via wire or wireless means, for example wirelessly over local-area network 154. In any case, when movable barrier gateway device 150 receives one or more signals from mobile transmitter 138, it causes movable barrier controller 102 to move garage door 106 into an open position. The signals generally comprise a modulated digital sequence, often in the form of data packets, which are well-known in the art.

After garage door 106 has been opened, and the user presumably inside the garage along with vehicle 146, mobile transmitter 138 stops transmitting the signal when, for example, the user turns mobile transmitter 138 off. For example, mobile transmitter 138 may receive power from a vehicle power source that is only energized while the vehicle is operating. When the vehicle ceases operation, for example a key is turned off or a "start/stop" button is pressed, power to mobile transmitter 138 is removed, and mobile transmitter ceases to transmit signals to movable barrier gateway device 150. When movable barrier gateway device 150 determines that it is no longer receiving the signals from mobile transmitter 138, it provides a signal to movable barrier controller 102 to move the garage door, thereby causing garage door 106 to close.

Figure 2:
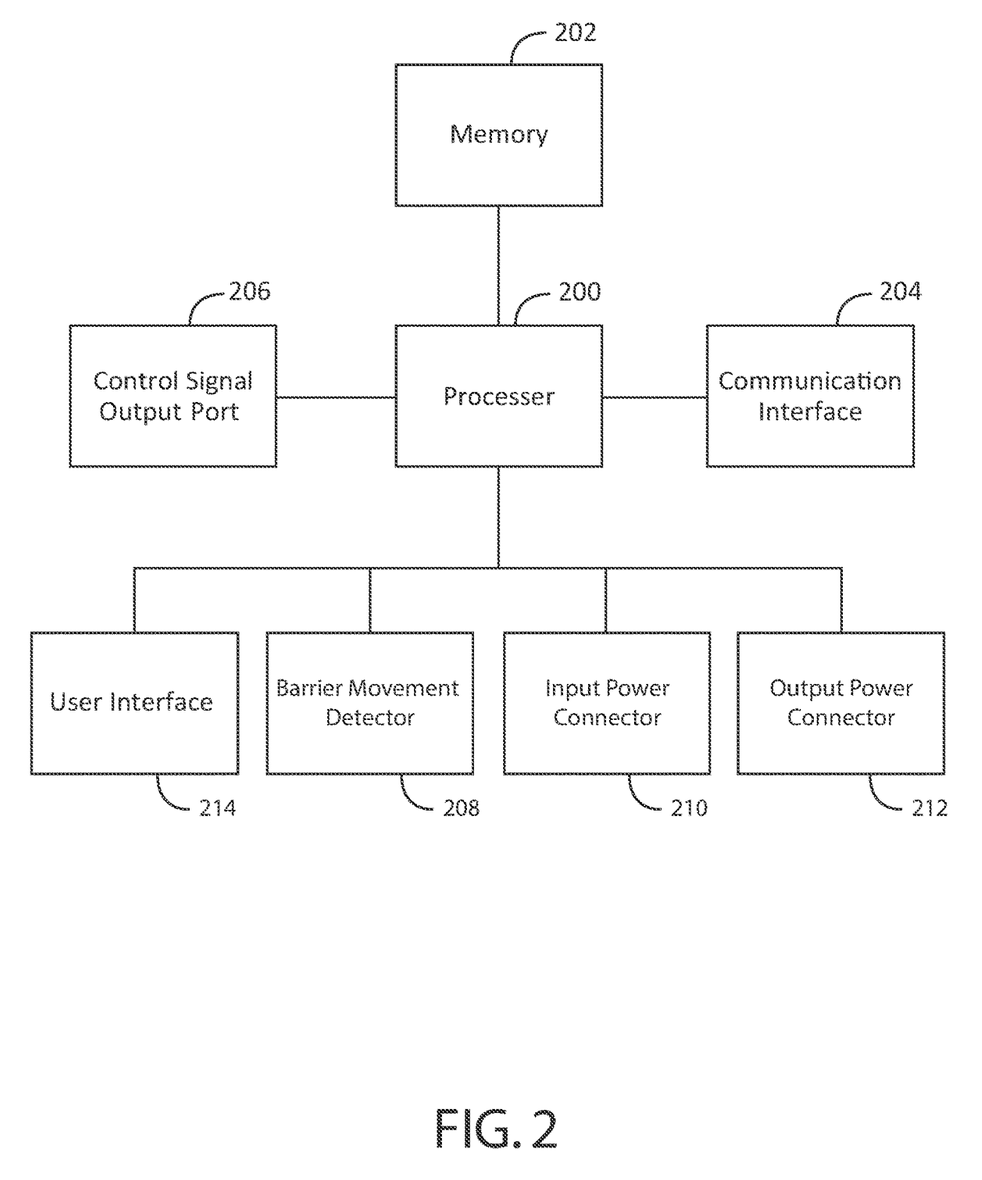
FIG. 2 is a functional block diagram of one embodiment of a movable barrier gateway device as shown in FIG. 1.

FIG. 2 is a functional block diagram of one embodiment of the movable barrier gateway device 150. Specifically, FIG. 2 shows processor 200, memory 202, communication interface 204, control signal output port 206, barrier movement detector 208, input power connector 210, output power connector 212, and optional user interface 214. It should be understood that not all of the functional blocks shown in FIG. 2 are required for operation of barrier gateway device 150 in all embodiments, that the functional blocks may be connected to one another in a variety of ways, and that not all functional blocks necessary for operation of the movable barrier gateway device 150 are shown for purposes of clarity.

Processor 200 is configured to provide general operation of barrier gateway device 150 by executing processor-executable instructions stored in memory 202, for example, executable code. Processor 200 typically comprises a general purpose processor, such as an ADuC7024 analog microcontroller manufactured by Analog Devices, Inc. of Norwood Massachusetts, although any one of a variety of microprocessors, microcomputers, microcontrollers, ASICS, and/or discrete components may be used alternatively.

Memory 202 comprises one or more information storage devices, such as RAM, ROM, EEPROM, UVPROM, flash memory, CD, DVD, Memory Stick, SD memory, XD memory, thumb drive, or virtually any other type of electronic, optical, or mechanical memory device. Memory 202 is used to store the processor-executable instructions for operation of barrier gateway device 150 as well as any information used by processor 200, such as identification information pertaining to mobile transmitter 138 or a user of mobile transmitter 138.

Communication interface 204 is electronically coupled to processor 200 and comprises receiver circuitry and/or software/firmware configured to receive modulated signals sent by mobile transmitter 138, either directly or via local-area network 154. In another embodiment, communication interface 204 further comprises transmitter circuitry and/or software/firmware configured to send information. In one embodiment, the information received by communication interface 204 one or more signals from mobile transmitter 138 that cause movable barrier gateway device 150 to open and/or close garage door 106. In another embodiment, in addition to the foregoing, the information comprises status information pertaining to a condition of the movable barrier system 100, for example, a status as to whether the garage door 106 is open, closed, partially open, partially closed, and/or whether a signal transmitted by mobile transmitter 138 was successful in operation or not. The received/transmitted information may be provided to processor 200 and/or stored in memory 202, while information transmitted from communication interface 204 is provided by processor 200. For receiving signals, communication interface 204 comprises circuitry well-known in the art for downconverting and demodulating received RF signals, using popular consumer-based frequencies such as 900 MHz, 345 MHz, or 433 MHz. In one embodiment, the receiver circuitry comprises Wi-Fi circuitry and associated firmware. In another embodiment, the circuitry is configured to receive signals in accordance with the well-known mesh network protocols, such as the Z-Wave® protocol. Of course, the circuitry could comprise circuitry to support multiple communication frequencies and/or protocols.

Control signal output port 206 comprises one or more physical terminals, connectors, ports, or other interfaces that allow electronic signals to be sent to movable barrier controller 102 via communication channel 152, which typically comprises a pair of insulated wires. In another embodiment, control signal output port 206, additionally or alternatively, comprises circuitry to wirelessly transmit signals to movable barrier controller 102. For example, the circuitry to wirelessly transmit comprises similar circuitry that is used in local transmitter unit 130 to transmit signals wirelessly to movable barrier controller 102, such as a rolling code generator and RF transmitter at a frequency compatible with movable barrier controller 102.

Barrier movement detector 208 comprises a device and/or circuitry that detects whether the garage door 106 has moved or is in movement, or a physical state (such as open or closed, partially open, etc.) as a result of a command to move garage door 106. In one embodiment, the barrier movement detector 208 comprises an accelerometer, such as the MMA7361L 3-Axis Accelerometer manufactured by Freescale Semiconductor of Austin, Texas. The accelerometer may be located within or on barrier gateway device 150, mounted to movable barrier controller 102, or virtually anywhere within the vicinity of barrier movement controller 102, such as on ceiling 108. The accelerometer may be connected by wired or wireless means to barrier gateway device 150 so that signals generated by the accelerometer can be provided to processor 200 for processing. In any case, the accelerometer detects movement of the garage door 106 by sensing vibration of the motor that is used to move the garage door via rail 112 and releasable trolley 114. When the motor is energized to either open or close the garage door 106, a vibration is typically produced by the motor that can be detected by the accelerometer. In the case where the accelerometer is mounted to the movable barrier controller 102, the vibration is directly sensed through the movable barrier controller 102 housing, as the motor is typically located within the movable barrier controller 102. In the case where the accelerometer is located on or within barrier gateway device 150, vibration from the motor is typically transmitted from the motor, through movable barrier controller 102 housing/mounts and through connecting materials, such as the garage ceiling 108, to barrier gateway device 150, where the vibration is strong enough to be detected by the accelerometer.

In another embodiment, the barrier movement detector 208 comprises a gyroscope that is used either in addition, or alternatively, to the accelerometer, such as the GWS PG-03 gyroscope found on many hobby websites. The gyroscope may also be mounted on/to barrier gateway device 150, movable barrier controller 102, or another location proximate to movable barrier controller 102 and is used to sense vibrations from the motor when the motor is energized to move the garage door 106 after receipt of a command from a local control device.

In yet another embodiment, the barrier movement detector 208 comprises current sensing mechanism/circuitry used to detect an increase in current draw by the motor as the motor begins moving the garage door 106. In this embodiment, barrier gateway device 150 may comprise an input power connector 210 typically in the form of a two or three prong male AC connector and an output power connector 212, typically in the form of a two or three prong female AC connector. One or both connectors may be located directly on/in a housing of barrier gateway device 150, enabling barrier gateway device 150 to plug directly into, for example, an existing AC socket in ceiling 108, while a power cord 158 from movable barrier controller 102 may be plugged into the output connector 112 found on barrier gateway device 150. The input power connector 210 is electrically connected to the output power connector 212 so that AC current from the input power connector 210 flows through barrier gateway device 150 and out via output connector 212, to movable barrier controller 102. In this way, power is provided both to the movable barrier gateway device 150 and the movable barrier controller 102.

During a quiescent state, e.g., when the motor is not operating, the current drawn by movable barrier controller 102 is relatively small, typically on the order of tens or hundreds of milliamps. This low current is used to power low-voltage circuitry inside movable barrier controller 102 as it awaits commands to move the garage door 106. Such low-voltage circuitry may include one or more processors, electronically memories, transmitters, and/or receivers whose function is to receive wireless commands from local control devices to move the garage door 106. If a local command is received by movable barrier controller 102 to move the garage door 106, the movable barrier controller 102 energizes a motor, typically within movable barrier controller 102, in order to move the garage door 106. When energized, the motor may draw a relatively large current, typically on the order of an ampere or more. The increase in current from the quiescent state to a state where the motor is energized may be detected by the current detection device as current flows through barrier gateway device 150 as a means to determine that the garage door 106 is moving.

In one embodiment, the current detection device is placed in-line, or in series, with at least one current-carrying conductor between input power connector 210 and output power connector 212. For example, the current detection device in this case may comprise a resistor, and the current flowing through the resistor determined by processor 200 measuring a voltage across the resistor.

In another embodiment, the current detection device comprises an inductive device which is placed near or around at least one of the current-carry conductors. Such a device may comprise a wire wound one or more times around an insulating cover of one or more current-carrying conductors, a current transformer located in proximity to a current-carrying conductor, a split-ring current transformer, or any other device known in the art to sense current flowing in a conductor.

In yet another embodiment, the barrier movement detector 208 comprises a tilt sensor/transmitter combination mounted to the garage door 106 and a receiver within barrier gateway device 150. In another embodiment, the receiver comprises the communication interface 204. Tilt sensors are known in the art for detecting a change in the orientation of a sensor. For example, a tilt sensor installed onto a panel of garage door 106 may be orientated in a first plane while the garage door is in a closed position. As the garage door is opened, the orientation of the tilt sensor with respect to the ground changes and whose orientation typically changes ninety degrees after the garage door 106 is fully opened. One example of a tilt switch is at AT407 manufactured by Light Country Company, Ltd., located in the People's Republic of China. Transmission circuitry is coupled to the tilt sensor for transmission of a tilt status to a central monitoring station, such as a security panel or local area network 154 so that this information may be used to determine if the garage door 106 is in an open state, closed state, or somewhere in between.

The transmission circuitry, in one embodiment, comprises Wi-Fi transmission circuitry. In another embodiment, the transmission circuitry comprises circuitry configured in accordance with the well-known Z-Wave® protocol. In one embodiment, communication interface 204 receives signals from the tilt sensor either directly or indirectly via local area network 154, security system 144, or both. As the garage door 106 is moved by movable barrier controller 102, the tilt orientation of the tilt sensor begins to change. This change is transmitted by the tilt sensor either directly to communication interface 204 or other receiver within the movable barrier gateway device 150, to the security system 144, to the local area network 154, or a combination of these. In any case, processor 200 receives notification that the tilt orientation of the tilt sensor has changed, indicating movement of the garage door 106.

Figure 3A:
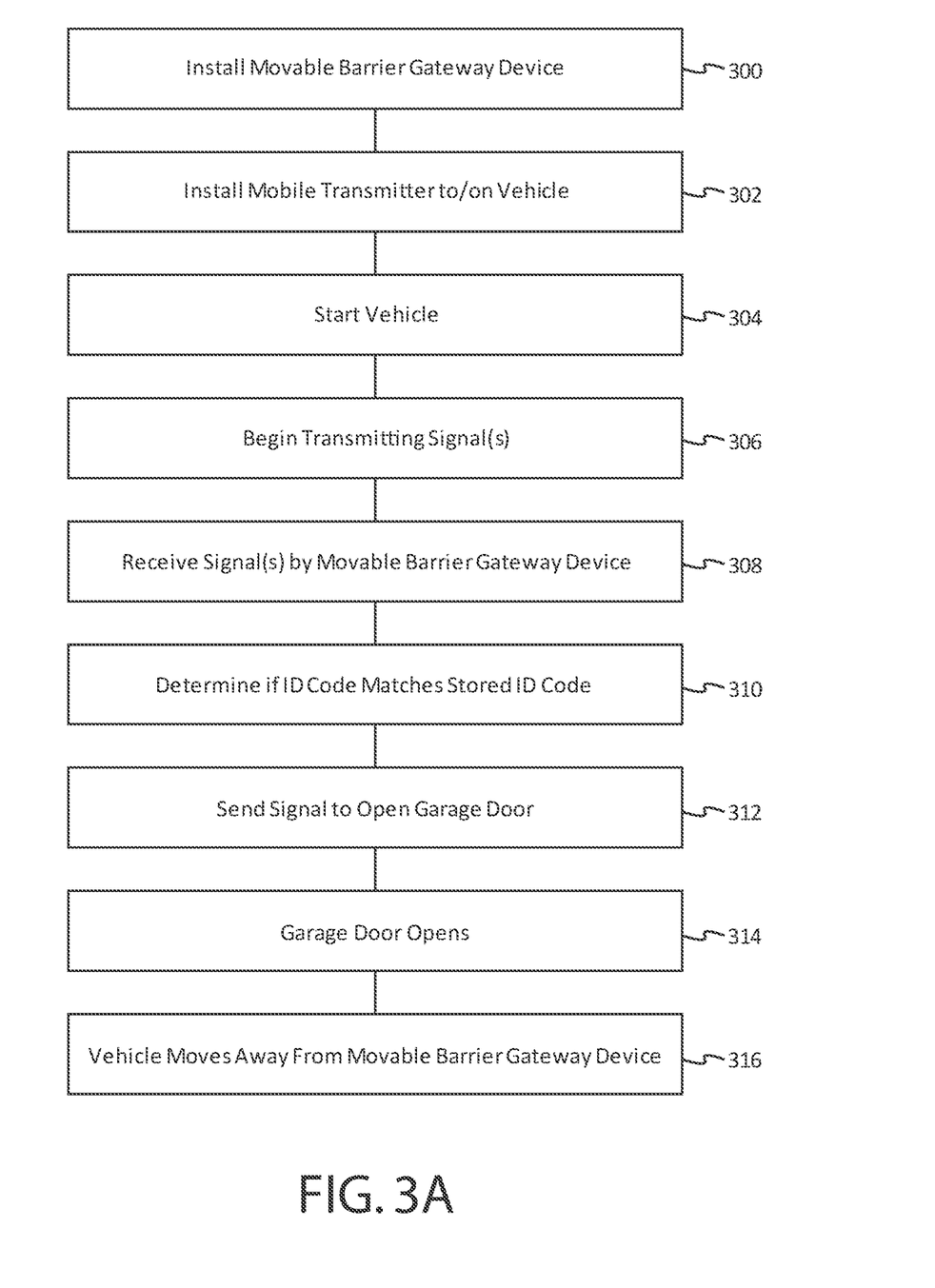
FIGS. 3A and 3B are flow diagrams illustrating one embodiment for automatically opening and closing a garage door without user intervention.
Figure 3B:
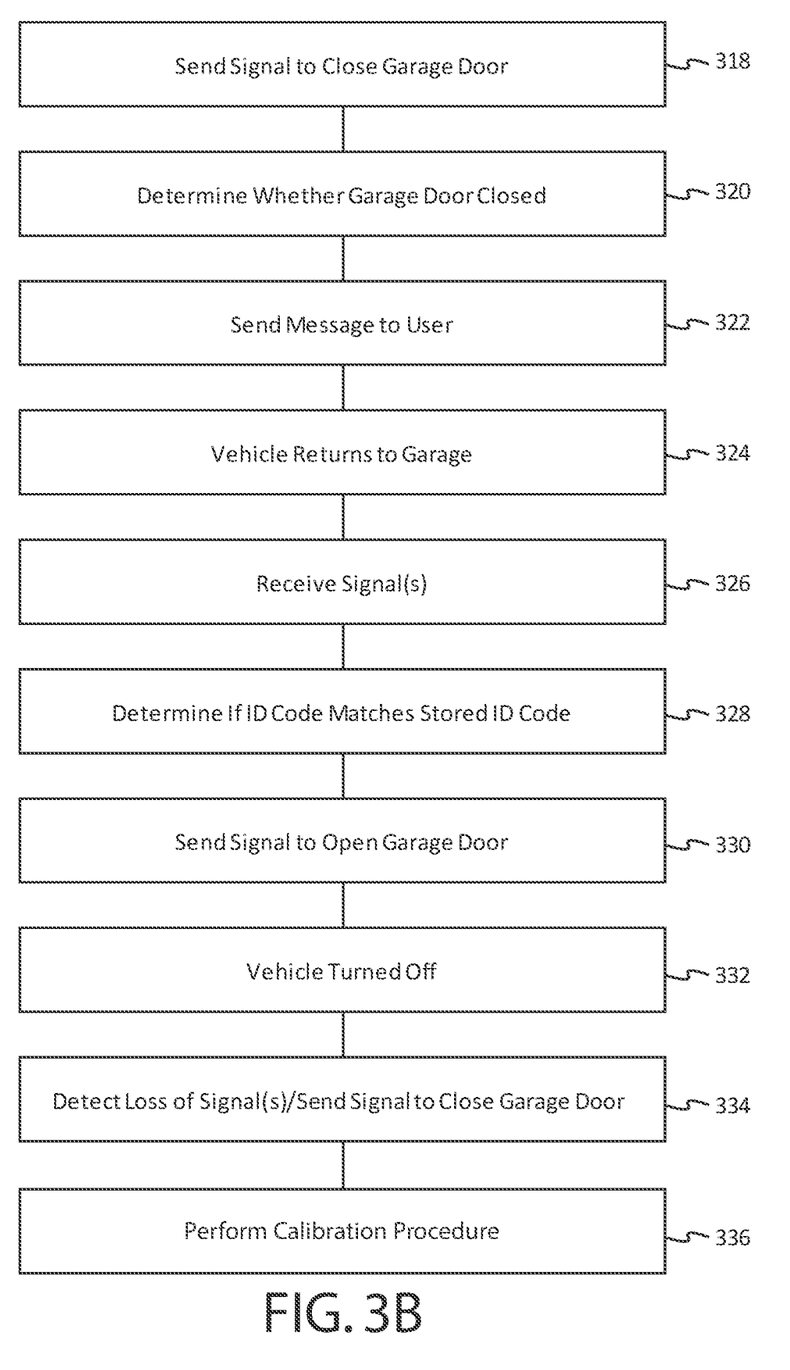

FIGS. 3*a* and 3*b* are flow diagrams illustrating one embodiment of automatically operating a movable barrier. The method is implemented by a processor, such as processor 200 shown in FIG. 2 located within the movable barrier gateway device 150, executing processor-executable instructions stored in a memory, such as memory 202. It should be understood that in some embodiments, not all of the steps shown in FIG. 3 are performed and that the order in which the steps are carried out may be different in other embodiments. It should be further understood that some minor method steps have been omitted for purposes of clarity.

At block 300, the movable barrier gateway device 150 is installed near legacy, movable barrier controller 102, which may comprise an existing garage door controller/motor that is not capable of being operated by devices over the Internet, or by mobile transmitter 138 or security system interface 142. In one embodiment, movable barrier gateway device 150 plugs directly into an existing AC electric socket in ceiling 108, and movable barrier controller 102 receives its power via the power cord 158 via a female AC power outlet on the movable barrier gateway device 150.

At block 302, a user installs mobile transmitter 138 onto or into the user's vehicle. In one embodiment, mobile transmitter 138 is wired to a 12 volt DC source that is only active when the vehicle's ignition system is on.

At block 304, the user starts the vehicle by convention methods, i.e., turning on the ignition, which in turn provides a DC voltage to mobile transmitter 138.

At block 306, in response to having voltage applied to it, mobile transmitter 138 begins autonomously, automatically and repeatedly transmitting one or more signals at predetermined time intervals without user intervention. The predetermined time interval is chosen such that garage door 106 will open within a relatively short time period from when mobile transmitter 138 comes within range of movable barrier gateway device 150, such as three seconds. So long as power is applied to mobile transmitter 138, it continues to transmit the one or more signals at the predetermined time interval.

In another embodiment, mobile transmitter 138 transmits only at certain times. For example, in one embodiment, mobile transmitter 138 comprises a position detector, such as a GPS receiver. In this embodiment, the user programs mobile transmitter 138 when mobile transmitter 138 is at or near the user's garage, for example, by pressing a "learn" button located on a housing of mobile transmitter 138. The GPS provides a position of mobile transmitter 138 when power to mobile transmitter 138 is applied. When processor determines that the position of the vehicle is within a predetermined distance from the user's garage, processor 200 causes a transmitter within mobile transmitter to begin transmitting the one or more signals at the predetermined time intervals. Similarly, when the user is arriving home to the user's garage, processor 200 determines that the vehicle is within the predetermined distance, and causes the transmitter to again begin transmission of the one or more signals at the predetermined time intervals.

In another embodiment, mobile transmitter 138 determines that a speed of the vehicle is less than a predetermined speed, indicating perhaps that the vehicle is or is approaching the user's garage. Mobile transmitter 138 may determine the vehicle's speed by accessing the vehicle's speedometer information, typically carried on a vehicle data bus, or it may determine the vehicle's speed via a GPS receiver. When processor 200 determines that the vehicle's speed is less than the predetermined speed, for example, 5 mph, processor 200 causes the transmitter to begin transmitting the one or more signals at the predetermined time intervals.

In any case, once mobile transmitter 138 receives power from the vehicle, it begins autonomously transmitting one or more signals at the predetermined time intervals without user intervention. Each of the one or more signals comprises an identification code uniquely identifying mobile transmitter 138 to movable barrier gateway device 150, such as a serial number. Processor 200 may select an adjustable transmission power that is high enough for movable barrier gateway device 150 or a local-area network to receive the one or more signals, but low enough such that movable barrier gateway device 150 or the local-area network does not receive the signal when the vehicle is more than a short distance from the garage, such as 20 feet.

At block 308, the one or more signals are received by movable barrier gateway device 150 via communication interface 204 and provided to processor 200 after demodulation. Reception of the one or more signals indicates that mobile transmitter 138 is within range of movable barrier gateway device 150.

At block 310, processor 200 evaluates the received one or more signals to determine if an identification code within the one or more signals matches an identification code stored in memory 202. A match indicates that mobile transmitter 138 is authorized to open or close garage door 106. The identification code may comprise any numeric, alpha, or alphanumeric sequences to uniquely identify one of a large number of possible mobile transmitters. In one embodiment, a match is determined when two or more signals are received within a predetermined time period, such as within three seconds from one another, and the signals each comprise an identification code matching the one stored in memory 202.

At block 312, when processor 200 determines that the identification code of the one or more signals matches the identification code stored in memory 202, processor causes a signal to be sent to movable barrier controller 102 for movable barrier controller to move garage door 106 via control signal output port 206 and communication channel 152. In one embodiment, the signal sent by processor 200 simply causes movable barrier controller 102 to move the garage door 106 in a direction chosen by the movable barrier controller 102. For example, the movable barrier controller 102 may be pre-programmed to move the garage door 106 opposite to the last direction that the garage door 106 was moved. In other words, if the garage door 106 had previously been moved towards the closed position, the signal from processor 200 might cause movable barrier controller 102 to move the garage door 106 to the open position.

Processor 200 generally does not send any further signals to movable barrier controller 102 after it sends the signal to movable barrier controller 102, even though processor 200 continues to receive signals from mobile transmitter 138 when the vehicle is in range of movable barrier gateway device 150 and is turned on. In one embodiment, processor 200 maintains the garage door in the open position so long as signals continue to be received having identification codes matching the identification code stored in the memory.

At block 314, in response to the signal sent to movable barrier controller 102 by processor 200, movable barrier controller 102 causes garage door 106 to open, and the user drives the vehicle out of the garage and on to the user's destination.

At block 316, as the user drives the vehicle away from the garage, the signal-to-noise ratio of the signals received from mobile transmitter 138 by movable barrier gateway device 150 get smaller and smaller, until eventually, at some distance, such as twenty feet, processor 200 is no longer able to construct the signals from noise.

At block 318, when processor 200 is no longer able to construct the signals from noise, processor 200 sends a signal to movable barrier controller 102 via communication channel 152 to move garage door 106. The signal causes movable barrier controller 102 to cause garage door 106 to close.

At block 320, processor 200 may determine whether the garage door 106 moved as a result of the signal provided to movable barrier controller 102 by processor 200. In this embodiment, processor 200 determines whether the garage door 106 has moved in conjunction with barrier movement detector 208, as described earlier, to detect conditions indicative of garage door 106 movement, such as sensing a vibration of the motor associated with movable barrier controller 102, sensing an increased current draw from the motor, sensing a change in tile orientation of a tilt sensor mounted to the garage door 106, or a combination of these methods, as discussed previously.

At block 322, when processor 200 determines that garage door 106 did not move in response to processor 200 sending the signal to movable barrier controller 102, processor 200 may send a message the user, for example, via a text message, automated phone call, or by some other means, to a user's mobile communication device 148, such as a smart phone, via local-area network 154 and wide area network 140 (i.e., the Internet), indicating that the garage door did not move. Such a message allows the user to return to the garage to investigate before the user is too far from the garage.

At block 324, at some time later and assuming that the garage door closed properly, the user returns home to the garage in/on the vehicle. Mobile transmitter 138 has been autonomously transmitting the one or more signals the entire time that the vehicle has been away from the garage, except for when the vehicle's ignition is turned off, cutting power to mobile transmitter 138.

At block 326, movable barrier gateway device 150 begins to receive the one or more signals transmitted autonomously from mobile transmitter 138, due to the vehicle coming in proximity to garage door 106, as the signal-to-noise ratio of the one or more signals increases past a minimum threshold.

At block 328, processor again evaluates the received one or more signals to determine if an identification code within the one or more signals matches an identification code stored in memory 202.

At block 330, when processor 200 determines that the identification code of the one or more signals matches the identification code stored in memory 202, processor causes a signal to be sent to movable barrier controller 102 for movable barrier controller to move garage door 106, via control signal output port 206 and communication channel 152. In this case, garage door 106 is opened by movable barrier controller 102. Processor 200 continues to receive signals from mobile transmitter 138 as the vehicle is pulled into the garage.

At block 332, the user turns the vehicle off. In response, power is removed from mobile transmitter 138.

At block 334, processor 200 determines that it is no longer receiving the signals from mobile transmitter 138. In response, processor 200 sends a signal to movable barrier controller 102 via communication channel 152 to move garage door 106. This causes movable barrier controller 102 to cause garage door 106 to close.

At block 336, a calibration process may be performed by the user, in order to define a distance that cause the garage door to open or close.

In one embodiment, calibration is performed by modifying an output transmission power of mobile transmitter 138. In this embodiment, mobile transmitter 138 comprises a user interface, such as a pushbutton, switch, etc. and optionally one or more LEDs or other visual or audible components in order to provide feedback to the user. To perform the calibration, the user turns on the vehicle and places it outside the garage at a distance where the user would like the garage door to open and close when the vehicle approaches or leaves. Mobile transmitter 138 begins transmitting signals as soon as it receives power from the vehicle. The garage door opens in response to movable barrier gateway device 150 receiving one or more of the repeating signals. The user then provides input to mobile transmitter 138 via the user interface, i.e., presses a button to initiate the calibration process. In response, mobile transmitter 138 begins slowly decreasing its transmission power, such as at a rate of −0.05 dB per second as it continues to transmit the one or more signals to movable barrier gateway device 150. When the garage door begins to close, the user once again provides input to mobile transmitter 138 via the user interface. This instructs mobile transmitter 138 to transmit all future signals at the power level achieved when the user provided input to mobile transmitter 138 when the garage door began to close. Thereafter, movable barrier gateway device 150 causes the garage door to open when the vehicle approaches the garage door at approximately the distance when mobile transmitter was calibrated, and also causes the garage door to close when the vehicle is more than the calibration distance from movable barrier gateway device 150.

In another embodiment, receiver sensitivity within movable barrier gateway device 150 is adjusted to set the open/close distance, rather than altering the transmission power output of mobile transmitter 138. In this embodiment, the user places the vehicle outside the garage as before at the desired distance from the garage, with the ignition on. As signals are received by communication interface 204, the user provides input to movable barrier gateway device 150 via user interface 214, i.e., presses a button to initiate the calibration process. In response, processor 200 begins slowly decreasing the sensitivity of the receiver circuitry associated with communication interface 204, such as at a rate of −0.05 dB per second as it continues to receive the one or more signals from mobile transmitter 138. When processor 200 can no longer detect the signals from movable barrier gateway device 150, it causes the garage door to close by sending a signal to movable barrier controller 102, and the user once again provides input to movable barrier gateway device 150 via user interface 214 when the garage door begins to close. In response, processor 200 may store the receiver sensitivity, or some criteria related thereto (such as a gain level) at the time user interface 214 is pressed in memory 202 and maintains the receiver sensitivity to the level achieved at the time user interface 214 was pressed. Thereafter, movable barrier gateway device 150 causes the garage door to open when the vehicle approaches the garage door at approximately the distance when mobile transmitter was calibrated, and also causes the garage door to close when the vehicle is more than the calibration distance from movable barrier gateway device 150.

In a related embodiment, rather than using user interface 214 to provide input to movable barrier gateway device 150 when the garage door begins to close, movable barrier gateway device 150 automatically detects the garage door movement using one of the techniques discussed above. When processor 200 can no longer detect the signals, it stores the current receiver sensitivity, or criteria related thereto, in memory 202 and maintains the receiver sensitivity to the level achieved at the time processor 200 sent the signal to movable barrier controller 102.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention can include a processor-readable media embodying a code or processor-executable instructions to implement the methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method, performed by a movable barrier gateway device in communication with a garage door controller, for automatically opening and closing a garage door without user intervention, comprising:
   receiving a plurality of wireless signals transmitted autonomously from a mobile transmitter located on or within a vehicle when the mobile transmitter is within range of the movable barrier gateway device, each of the wireless signals comprising an identification code identifying the mobile transmitter;
   determining that the identification code in at least one of the wireless signals matches an identification code stored in a memory of the movable barrier gateway device; and
   sending a command to the movable barrier controller that causes the movable barrier controller to open the garage door when an identification code in at least one of the wireless signals matches the identification code stored in the memory.

2. The method of claim 1, wherein sending the command to the movable barrier controller when an identification code in at least one of the wireless signals matches the identification code stored in the memory comprises matching at least two identification codes in at least two received wireless signals.

3. The method of claim 1, further comprising:
after identifying at least one wireless signal that comprises an identification code matching the identification code stored in the memory, determine that no further wireless signals are being received that comprise the identification code stored in the memory; and
in response to determining that no further wireless signals are being received that comprise the identification code stored in the memory, sending a second command to the movable barrier controller that causes the movable barrier controller to close the garage door.

4. The method of claim 3, further comprising:
determining that the garage door did not close after sending the second command to the movable barrier controller;
retrieving contact information pertaining to a user of the movable barrier gateway device from the memory;
generating a message indicating that the garage door failed to close; and
wirelessly sending the message to the user using the contact information stored in the memory.

5. The method of claim 1, further comprising:
maintaining the garage door in the open position so long as the wireless signals from the mobile transmitter comprising the identification code stored in the memory continue to be received.

6. The method of claim 1, further comprising:
receiving input from a user of the movable barrier gateway device to perform a calibration of the movable barrier gateway device when the vehicle is located at a predetermined distance from the garage, the calibration causing the movable barrier gateway device to send the command to the movable barrier controller when the vehicle is located at the predetermined distance from the garage.

7. The method of claim 1, wherein the mobile transmitter autonomously and repeatedly transmits the wireless signal at a power level that limits reception of the wireless signals to a predetermined distance from the movable barrier gateway device.

8. The method of claim 1, wherein the plurality of wireless signals begins to be transmitted by the mobile transmitter when power is applied to the mobile transmitter as the vehicle is started.

9. The method of claim 1, wherein the plurality of wireless signals cease to be transmitted by the mobile transmitter when power is removed from the mobile transmitter when the vehicle is turned off.

10. A system for automatically opening and closing a garage door without user intervention, comprising:
a mobile transmitter installed on or in a vehicle, wherein the mobile transmitter autonomously and repeatedly transmits a wireless signal comprising an identification code identifying the mobile transmitter;
a movable barrier gateway device coupled to a movable barrier controller inside a garage, the movable barrier gateway device configured to receive at least one of the wireless signals transmitted autonomously and repeatedly from the mobile transmitter when the mobile transmitter is within range of the movable barrier gateway device, determine that the identification code in at least one of the wireless signals matches an identification code stored in a memory of the movable barrier gateway device, and send a command to the movable barrier controller that causes the movable barrier controller to open the garage door when an identification code in at least one of the wireless signals matches the identification code stored in the memory.

11. The system of claim 10, wherein sending the command to the movable barrier controller when an identification code in at least one of the wireless signals matches the identification code stored in the memory comprises matching at least two identification codes in at least two received wireless signals.

12. The system of claim 10, wherein the movable barrier gateway device is further configured to:
after identifying at least one wireless signal that comprises an identification code matching the identification code stored in the memory, determine that no further wireless signals are being received that comprise the identification code stored in the memory, and
in response to determining that no further wireless signals are being received that comprise the identification code stored in the memory, send a second command to the movable barrier controller that causes the movable barrier controller to close the garage door.

13. The system of claim 12, wherein the movable barrier gateway device is further configured to:
determine that the garage door did not close after sending the second command to the movable barrier controller;
retrieve contact information pertaining to a user of the system from the memory;
generate a message indicating that the garage door failed to close; and
wirelessly send the message to the user using the contact information stored in the memory.

14. The system of claim 10, wherein the movable barrier gateway device is further configured to maintain the garage door in the open position so long as the wireless signals from the mobile transmitter comprising the identification code stored in the memory continue to be received.

15. The system of claim 10, wherein the movable barrier gateway device is further configured to:
receive input from a user of the system to perform a calibration of the movable barrier gateway device when the vehicle is located at a predetermined distance from the garage, the calibration causing the movable barrier gateway device to send the command to the movable barrier controller when the vehicle is located at the predetermined distance from the garage.

16. The system of claim 10, wherein the mobile transmitter autonomously and repeatedly transmits the wireless signal at a power level that limits reception of the wireless signals to a predetermined distance from the movable barrier gateway device.

17. The system of claim 10, wherein the mobile transmitter is configured to begin transmitting the wireless signals when power is applied to the mobile transmitter as the vehicle is started.

18. The system of claim 10, wherein the mobile transmitter is configured to cease transmitting the wireless signals when power is removed from the mobile transmitter as the vehicle is turned off.

* * * * *